United States Patent [19]
Daniel

[11] Patent Number: 5,844,197
[45] Date of Patent: Dec. 1, 1998

[54] ARC RETRACT CIRCUIT AND METHOD

[75] Inventor: Joseph A. Daniel, Mentor, Ohio

[73] Assignee: The Lincoln Electric Company, Cleveland, Ohio

[21] Appl. No.: 901,640

[22] Filed: Jul. 28, 1997

[51] Int. Cl.[6] .................................................. B23K 10/00
[52] U.S. Cl. ............................... 219/121.57; 219/121.54; 219/121.59; 219/130.32
[58] Field of Search ........................ 219/121.54, 121.57, 219/121.39, 121.44, 121.59, 121.56, 130.31, 130.32, 130.33

[56] References Cited

U.S. PATENT DOCUMENTS

| | | |
|---|---|---|
| 4,017,707 | 4/1977 | Brown et al. . |
| 4,156,125 | 5/1979 | Brown et al. . |
| 4,300,036 | 11/1981 | Johansson . |
| 4,410,788 | 10/1983 | Summers et al. . |
| 4,766,286 | 8/1988 | Iceland . |
| 4,901,720 | 2/1990 | Bertrand . |
| 4,906,811 | 3/1990 | Buil . |
| 4,943,699 | 7/1990 | Thommes . |
| 4,983,807 | 1/1991 | Yamada et al. . |
| 4,987,285 | 1/1991 | Dallavalle et al. . |
| 4,996,407 | 2/1991 | Traxler . |
| 5,036,176 | 7/1991 | Yamaguchi et al. . |
| 5,235,162 | 8/1993 | Nourbakhsh .................... 219/121.54 |
| 5,290,995 | 3/1994 | Higgins et al. . |
| 5,528,010 | 6/1996 | Herwig et al. . |
| 5,530,220 | 6/1996 | Tatham . |
| 5,620,617 | 4/1997 | Borowy et al. . |
| 5,630,952 | 5/1997 | Karino et al. . |
| 5,660,745 | 8/1997 | Naor .................................... 219/121.57 |

FOREIGN PATENT DOCUMENTS

| | | |
|---|---|---|
| 61-219473 | 9/1986 | Japan . |
| 61-219474 | 9/1986 | Japan . |
| 61-219475 | 9/1986 | Japan . |
| 2-217165 | 8/1990 | Japan . |

*Primary Examiner*—Mark H. Paschall
*Attorney, Agent, or Firm*—Vickers, Daniels & Young

[57] ABSTRACT

An arc retract circuit for use in a plasma arc system with a torch having an electrode and a nozzle, a power supply for providing a D.C. current, a power circuit for connecting the power supply across said electrode and a workpiece to be cut, a power switch for connecting the nozzle to the power supply when in a closed condition defining a pilot arc mode of operation and for disconnecting the nozzle from the workpiece when in an open condition defining a cut mode of operation, an amplifier for regulating said power supply to a first set current when in the pilot arc mode and a second set current when in the cut mode, and an arc retract circuit for shifting the power switch from the open condition to the closed condition, which arc retract circuit includes a current sensing circuit for creating a first signal representing the actual current applied by the power supply to the power circuit, structure for creating a second signal representative of a current level below the second set current, and switch operations structure for closing the power switch when the first signal is substantially equal to the second signal.

16 Claims, 7 Drawing Sheets

ARC RETRACT CIRCUIT AND METHOD

The present invention relates to the art of a plasma arc system and particularly to the improved arc retract circuit and method for retracting the cutting arc to the torch when the length of the arc attempts to exceed the power available from the power supply.

INCORPORATION BY REFERENCE

In the operation of a plasma arc system, the torch has two distinct modes of operation. When in the pilot arc mode, the arc of the torch is between the electrode and nozzle of the torch awaiting use for cutting or otherwise processing a metal workpiece. In the cutting or operating mode, the plasma arc extends from the electrode to the workpiece. As a workpiece is being cut, the arc can be extinguished as its length is increased beyond the power capability of the D.C. power supply driving the torch. Consequently, it is standard practice to equip a plasma arc system with an arc retract circuit wherein the arc is positively shifted from the workpiece back to the torch between the electrode and nozzle as the length of the arc increases toward a condition which will extinguish the arc. To illustrate background information and technology associated with retracting an arc from the cutting mode to the pilot arc mode in response to conditions experienced by the torch, certain prior art patents are incorporated by reference herein.

In Traxler U.S. Pat. No. 4,996,407, a prior art circuit is explained wherein the voltage between the nozzle and workpiece of a plasma arc torch is monitored. As this voltage from the power supply exceeds a given level, a switch in the pilot arc branch is closed to transfer the arc from the workpiece to the nozzle. This patent is directed toward a circuit wherein a comparator controls the operation of a power switch in the pilot arc circuit of the plasma arc torch in response to a signal indicative of the voltage of the power supply. When the voltage between the nozzle and workpiece is less than a preselected level, the power switch is opened to shift the plasma arc torch to the cut mode of operation. The comparator shifts the plasma arc torch into the pilot arc mode of operation by closing the power switch in the pilot arc circuit when the voltage across the workpiece and nozzle exceeds a preselected value. This prior art patent is incorporated by reference herein to teach the use of a sensed voltage value, which voltage value is compared to a signal representing a reference voltage for the purpose of retracting the arc from the workpiece to the nozzle when the sensed voltage is greater than the referenced voltage. A disadvantage of this circuit is that it is controlled by the voltage of the power supply. Consequently, voltage must be monitored between the workpiece and nozzle. However, the operation of a plasma arc torch retract circuit is illustrated and discussed in this prior art patent.

In Borowy U.S. Pat. No. 5,620,617 the output of a standard error amplifier is used to control the power supply. By comparing this output to a selected fixed voltage indicated to be the maximum output voltage for the power supply an arc retract signal is created. This comparison is used to retract the arc from the workpiece to the nozzle when the output of the error amplifier increases to a fixed voltage set as a characteristic of the D.C. power supply.

These patents are incorporated in reference herein and are explained briefly for the purpose of disclosing the reasons for, and the advantages of, retracting the arc as the voltage of the cutting arc increases beyond a given value during the cutting mode of operation. The plasma arc system can, thus, be shifted automatically to the pilot arc mode of operation instead of allowing the cutting arc to be extinguished. The technology of these patents, the need for, and the advantages of, an arc retract circuit for a plasma arc system need not be repeated.

BACKGROUND OF THE INVENTION

The discussion of the prior art patents which are incorporated by reference herein illustrates the background to which the invention is directed. Known arc retract circuits and methods of retracting the arc have been complicated, expensive to implement and have reduced the effectiveness of the plasma arc system during cutting operations. Maintenance of the integrity of the plasma arc between cutting operations is extremely important. Without the ability to retract the arc between cutting operations, each cutting operation must be preceded by an arc start sequence for the torch. Such sequencing of the arc is time consuming, expensive, inefficient and distracts from commercial acceptability of plasma arc torches.

After a cutting operation of the torch is completed, the arc must be maintained and returned to the torch to a location between the nozzle and the electrode for efficient operation of a plasma arc torch. Return of the arc to the nozzle maintains the pilot arc and eliminates the need for restriking the arc between cutting operations. This feature for a plasma arc system is especially useful when cutting expanded metal or quickly cutting several different pieces of metal. The arc is maintained by enabling current flow through the nozzle before the cutting arc is actually extinguished due to lack of power from the power supply. The cutting arc is lost when the electrode moves away from the workpiece and the required arc voltage increases above the capability of the power source used to drive the torch. In this instance, the arc will be lost or extinguished unless an alternative lower voltage path is created. This lower voltage path is created by reconnecting the nozzle to the power supply by closing the standard power switch provided in the pilot arc circuit. Prior arc retract circuits have involved voltage measurements and reduced utilization of the capabilities available from a given power supply or source.

THE INVENTION

The present invention is directed toward an improvement in the arc retract circuit of the plasma arc system with a cutting torch and a new method of retracting the arc in such a torch. The improved arc retract circuit is employed to shift the power switch from the open condition to the closed condition to shift between a cutting mode and a pilot arc mode. The invention involves the concept of creating a first signal representing the actual current applied by the power supply to the power circuit driving the plasma torch, creating a second signal representative of a current level below the set current level for the cutting operation and closing the power switch in the pilot arc circuit when the first signal is essentially equal to the second signal. In this manner, the cutting arc is transferred to the nozzle when the output current being regulated by the power supply droops below the cutting current to which the power supply is being regulated. In accordance with an aspect of the invention, the current level to which the actual current from the power supply is compared to a current level that has a percentage relationship to the set cutting current to which the power supply is being regulated. In practice this percentage is in the range of 60–80%. By using the invention, the power supply driving the torch will operate at its maximum capability over various current settings used during the cutting operation.

In accordance with another aspect of the present invention there is provided a novel method of retracting the arc to establish a pilot mode of operation in a plasma arc system having a cutting torch. This method comprises the steps of creating a first signal representative of the actual current applied by the power supply to the power circuit of the torch, creating a second signal representative of a current level below the set current and closing the power switch of the pilot circuit when the first signal is substantially equal to the second signal. In accordance with the more limited aspect of the present invention, the current level which the actual output current of the power supply is compared is a percentage of the set current used in the cutting mode of the operation. This percentage, in practice, is in the general range of 60–80%.

The primary object of the present invention is the provision of an improved arc retract circuit and a novel arc retract method for a plasma arc torch, which circuit and method operate independently of any voltage signal from the error amplifier and independently of a set output voltage for the power supply. In accordance with another aspect of the present invention, the circuit and method, as defined above, do not require sensing a voltage in the control circuit of the plasma arc torch for the purposes of retracting the arc to the nozzle.

Still a further object of the present invention is the provision of a circuit and method, as defined above, which circuit and method utilize all the available power from the D.C. power source without restraints during the operation of a cutting arc.

Another object of the present invention is the provision of the circuit and method, as defined above, which circuit and method allows a cutting operation for the torch of a plasma arc system until the power supply actually exhausts its maximum output power for any given cutting current.

Still a further object of the present invention is the provision of a circuit and method, as defined above, which circuit and method create a longer usable cutting arc during the cutting operation, reduce current overshoot into the nozzle when the arc is returned or retracted to the nozzle, reduce the required size of the power switch in the pilot circuit and prevent over current damage to the nozzle in the plasma arc torch.

These and other objects and advantages will become apparent from the following description taken together with the accompanying drawings.

PREFERRED EMBODIMENT

Figure 1:
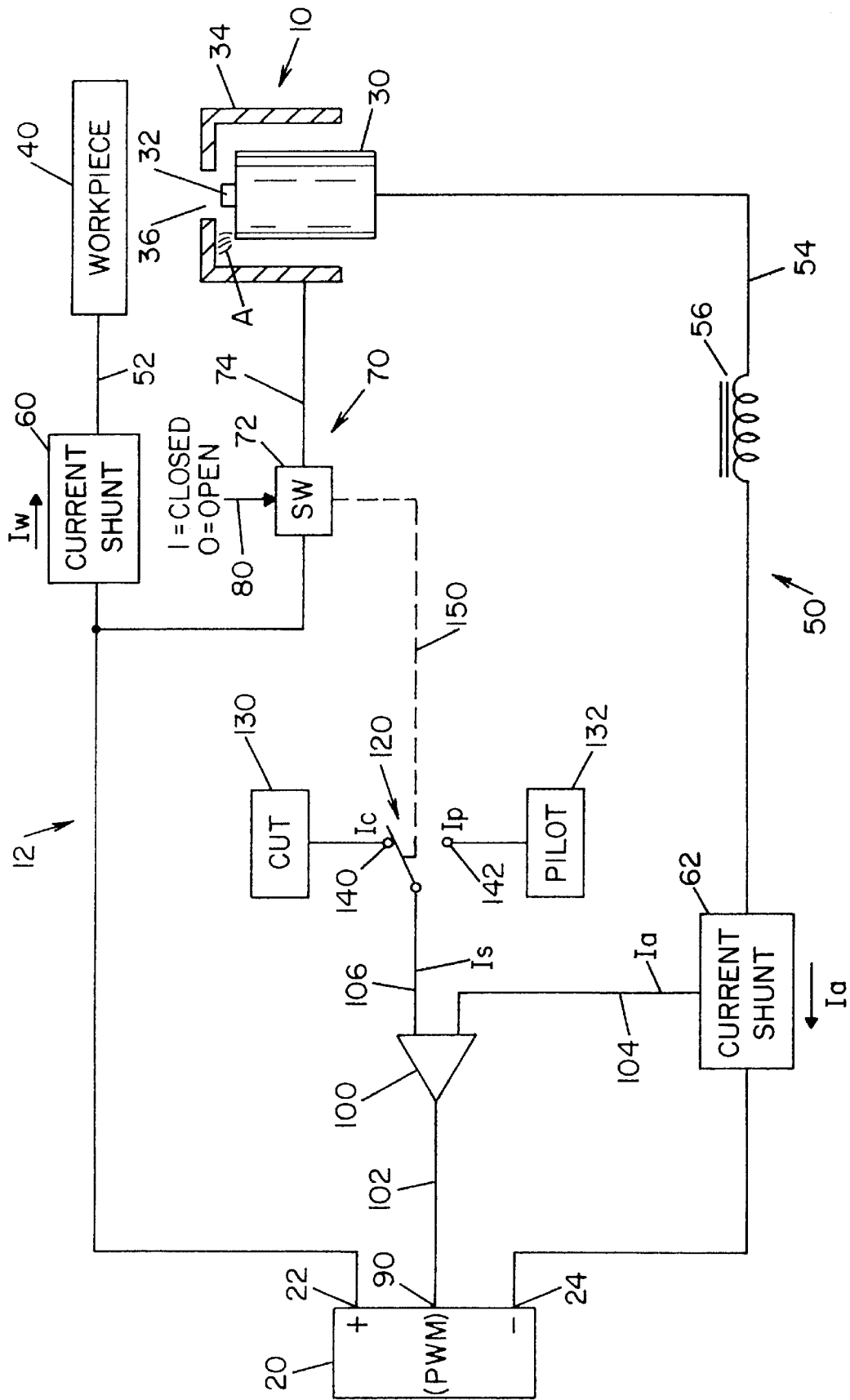
FIG. 1 is a wiring diagram showing a standard circuit for a plasma arc torch of the type having an electrode, nozzle and power switch for converting between a pilot mode of operation and a cutting or operating mode of operation.

Referring now to the drawings, wherein the showings are for the purpose of illustrating a preferred embodiment of the invention only and not for the purpose of limiting same, FIG. 1 shows standard circuit wherein torch 10 of a plasma arc system has a control circuit 12 driven by a D.C. power supply 20 with a positive output terminal 22 and a negative output terminal 24. This power supply is normally an inverter and is adjusted by regulating the voltage on a pulse width modulator (PWM) to maintain a desired set current which has a higher level during the cutting mode of operation (i.e. 40–60 amperes) and a lower level during the pilot arc mode of operation (i.e. 15–30 amperes). Torch 10 includes electrode 30 with a tip 32 surrounded by nozzle 34 having a plasma arc outlet orifice 36. Workpiece 40 is a metal component and forms a part of the circuit during the cutting operation when D.C. current is provided through a power circuit 50 including leads 52, 54. Lead 52 is connected to workpiece 40 and lead 54 is connected to electrode 30. Power circuit 50 also includes a standard choke 56 and current sensing shunts 60, 62 for detecting workpiece current Iw and the total output current of the power supply Ia, respectively. When the workpiece is moved away from nozzle 34, or is removed altogether, there is no current flow through lead 52 to workpiece 40. During pilot arc operation, the current flows in circuit 70 through a power switch 72 connected in line 74. This line may also include a current limiting resistor which is not shown. The logic on line 80 controls the condition of power switch 72. In the illustrated embodiment, a logic 1 on line 80 closes power switch 72. In a like matter, a logic 0 on line 80 opens power switch 72 to connect nozzle 34, by line 74, to the output of power supply 20 to establish the pilot arc mode of operation. With switch 72 closed, current flows between the electrode and nozzle, illustrated as pilot arc A, in FIG. 1. During conversion to the pilot mode of operation, switch 72 is first closed and then arc A transfers to the pilot arc position, as shown in FIG. 1. When switch 72 is opened, voltage is applied by power supply 20 across electrode 30 and workpiece 40, assuming there is a workpiece in a cutting position adjacent torch 10. The resistance of the arc determines the voltage necessary for maintaining a preselected cutting current.

Power supply 20 is controlled by pulse width modulation so the output current is regulated by the voltage on input 90 which is supplied by error amplifier 100 having an output 102. The voltage on output 102 is the voltage applied to the pulse width modulator control (PWM) of power supply 20 for the purposes of increasing the duty cycle of the power supply to increase the available current being delivered to torch 10. Error amplifier 100 is controlled by the voltage on input 104 and input 106. Input 104 has a signal representative of the total current Ia in circuit 12. This actual current is compared to a set current on line, or input, 106; which may be either a first set current for pilot arc mode of operation or a second set current for a cutting mode. Standard mode selector switch 120 includes additional switches shown as switch 122 and switch 124 in FIG. 2. When switch 120 is moved selectively between inputs 130 and 132 either switch 122 or switch 124 is closed. When mode selector switch 120 is connected to current input 130 at terminal 140, torch 10 is set to operate in the cutting mode with the set current controlling error amplifier 100. When current input 132, which is the pilot arc current control, is selected by moving mode selector switch 120 to terminal 142, error amplifier 100 controls power supply 20 to regulate the current to a set pilot arc current. The pilot arc current is normally in the range of 15–30 amperes. The cutting current is normally in the range of 50–60 amperes. When power switch 72 is shifted between a closed condition and an open condition, control line 150, also shown in FIG. 2, establishes the setting of mode selector switch 120 in accordance with the condition of power switch 72.

In operation, plasma arc torch 10 is started by establishing pilot arc A between the electrode and nozzle with switch 72 closed. This can be accomplished by a contact start arrangement or by use of high frequency. Such starting concepts are known and are not a part of the present invention. Mode selector switch 120 is shifted to terminal 142 causing error amplifier 100 to adjust power supply 20 for regulating the output current Ia to the set pilot arc current, such as 15–30 amperes. As workpiece 40 is moved close to nozzle 34, the gap between the workpiece and electrode is ionized causing a small current flow through current sensor 60. When the workpiece is close enough and cutting is desired, power switch 72 is opened and mode selector switch 120 is shifted to the position shown in FIG. 1. Error amplifier 100 regulates current Ia to the cutting current Ic, in the preferred embodiment 55 amperes. As so far described, plasma arc torch 10 operates in accordance with standard technology. As the workpiece 40 is moved away from nozzle 34, power supply 20 has an increased duty cycle to provide more voltage. In the past the cutting arc would be extinguished when the workpiece is removed or the arc length (standoff) increases beyond a controllable length. The integrity of the arc is maintained by an arc retract circuit which closes switch 72 before the arc is extinguished so the pilot arc is maintained and the torch remains operative without restarting. Such arc retract circuits are well known in the plasma art; However, the present invention is an improved circuit and results in a novel method of retracting the arc.

Figure 2:
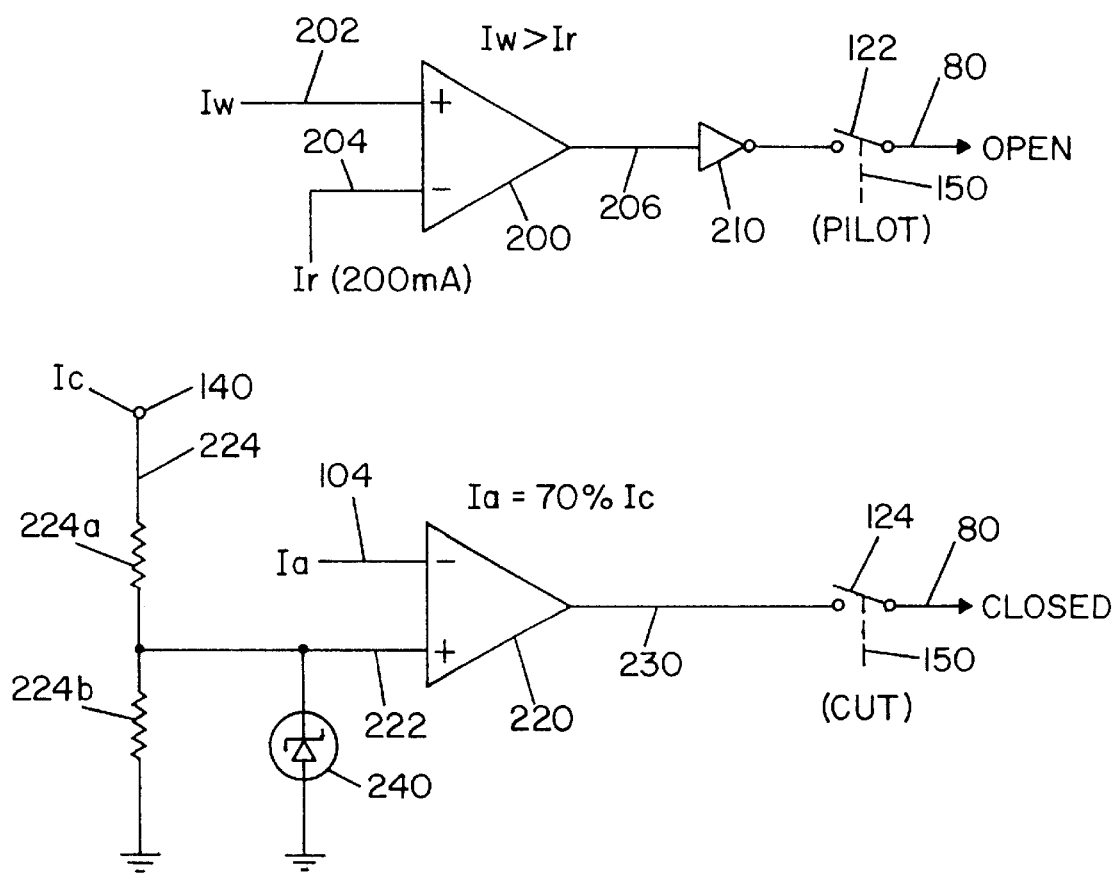
FIG. 2 is a partial wiring diagram illustrating a first circuit for shifting from pilot mode of operation to cutting mode of operation and a second circuit constituting the preferred embodiment of the present invention for retracting the arc and converting between the cutting mode of operation and a pilot mode of operation.

Referring now to FIG. 2, control logic used for shifting power switch 72 into the cut mode of operation is illustrated in the upper circuit. Comparator 200 has inputs 202, 204 and an output 206. The voltage on input 202 has a level determined by current sensor 60, which sensor gives a signal representative of the workpiece current Iw through workpiece 40. This current level or magnitude is compared with a reference signal Ir provided on input 204. When the workpiece current in input 202 exceeds the reference current Ir on input 204, which current in practice is set at 200 mA, the logic on output 206 shifts to a logic 1. Inverter 210 inverts the logic to a logic 0. When selector switch 120 is in the pilot arc mode of operation, switch 122 is closed. Consequently, a logic 0 appears on line 80 to open switch 72, which was closed. To open switch 72, switch 122 is closed (pilot mode) and Iw increases to Ir. The workpiece current Iw increases as workpiece 40 is moved close to torch 10. The gap between workpiece 40 and electrode 30 is ionized to cause workpiece current Iw to flow. This current causes a logic 0 in line 80 to shift the torch from the pilot mode of operation to the cut mode of operation. In like matter, comparator 220, which is a part the improvement in the arc retract circuit and the novel method constituting the invention when selection switch 120 is in the cut mode. Comparator 220 is functional when switch 124 is closed to shift from the cut mode. Switch 124 is closed during the cutting operation wherein the plasma arc is retracted from the workpiece and maintained as a pilot arc with the nozzle. To accomplish the shift comparator 220 functions in a manner to practice the invention. Input 222 is controlled by an intermediate voltage level of voltage divider 224. The voltage divider has its upper end connected to terminal 140. The voltage level on terminal 140 is a set voltage for the cut mode of operation provided by input 130. The lower end of voltage divider 224 is grounded whereby sections 224a and 224b allows the input 222 to be at a fixed percentage of the voltage on terminal 140. Consequently, input 222 is a signal representing a given percentage of the set current Ic to which power supply 20 is regulated during the cutting mode of operation. The second input for comparator 220 is line 104 which also, in the preferred embodiment, is the input of error amplifier 100. Input 104 could sense the actual current at a mode which is not associated with the error amplifier since the interconnection of the error amplifier and comparator 220 is not critical. Comparator 220 compares the actual current from the power supply flowing in circuits 12 and the percentage of the set current value. The actual current can be sensed at various locations. In practice, the percentage of the current is 70%; however, it is preferably in the range of 60–80%. In operation, comparator 220 has a logic 0 in output 230 until the actual current Ia droops below 70% of the current set point Ic. In normal operation, the actual current Ia equals the set current Ic during the cutting mode of operations since error amplifier 100 regulates power supply 20 to this current level. However, as the arc length or standoff increases, its resistance is increased and power supply 20 cannot supply sufficient current to maintain the regulated current Ic. When that occurs, the actual current Ia droops below the regulated current Ic. When the current droop reaches 70% of the regulated current Ic during the cut mode of operation, (switch 124 is closed) a logic 1 appears in output 230. This logic 1 is directed to switch 72 by line 80 so that switch 72 is closed. When that occurs, the plasma arc is retracted to the nozzle, as shown in FIG. 1. By using the present invention, the complete capabilities of power supply 20 are realized without switching back and forth at some fictitious reference voltage. By controlling the arc retract circuit on a current basis, the maximum efficiency and utilization of power supply 20 are obtained.

Figure 7:
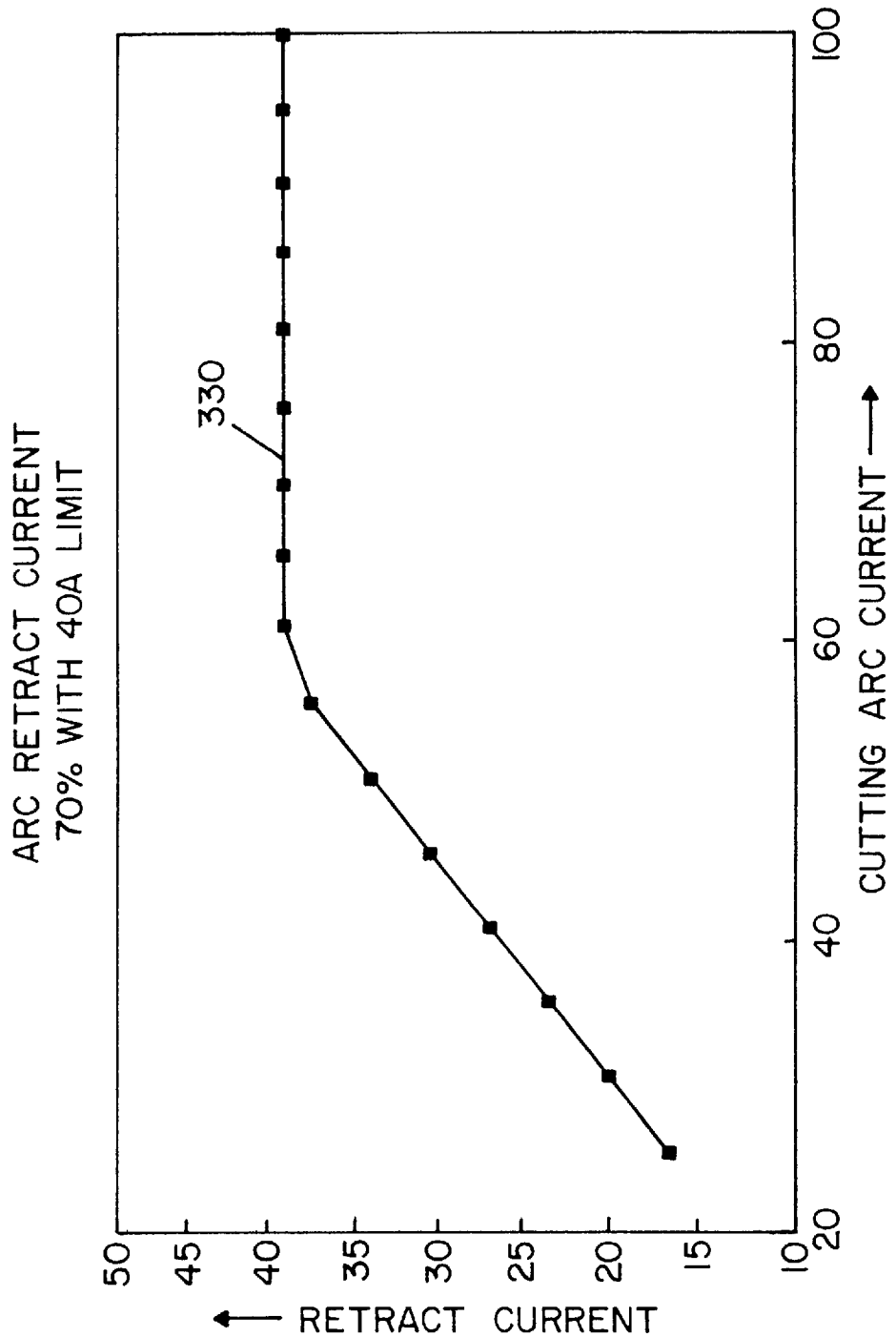

In practice, voltage divider 224 is used to preset input 222 as a percentage of the set cutting current Ic. However, as an alternative, line 222 could be set at a preselected level below Ic so that it is not a percentage, but merely a current level below the regulated current Ic during the cut mode of operation. As current Ia droops, it would intersect the reduced current (Ic-x) causing a maximum utilization of the power supply. Either a percentage or a preselected reduction in the set current is used in comparator 220. Zener diode 240 can be connected between input 222 and ground to limit the maximum voltage level on input 222. The result of this zener diode is illustrated in FIG. 7.

Figure 3:
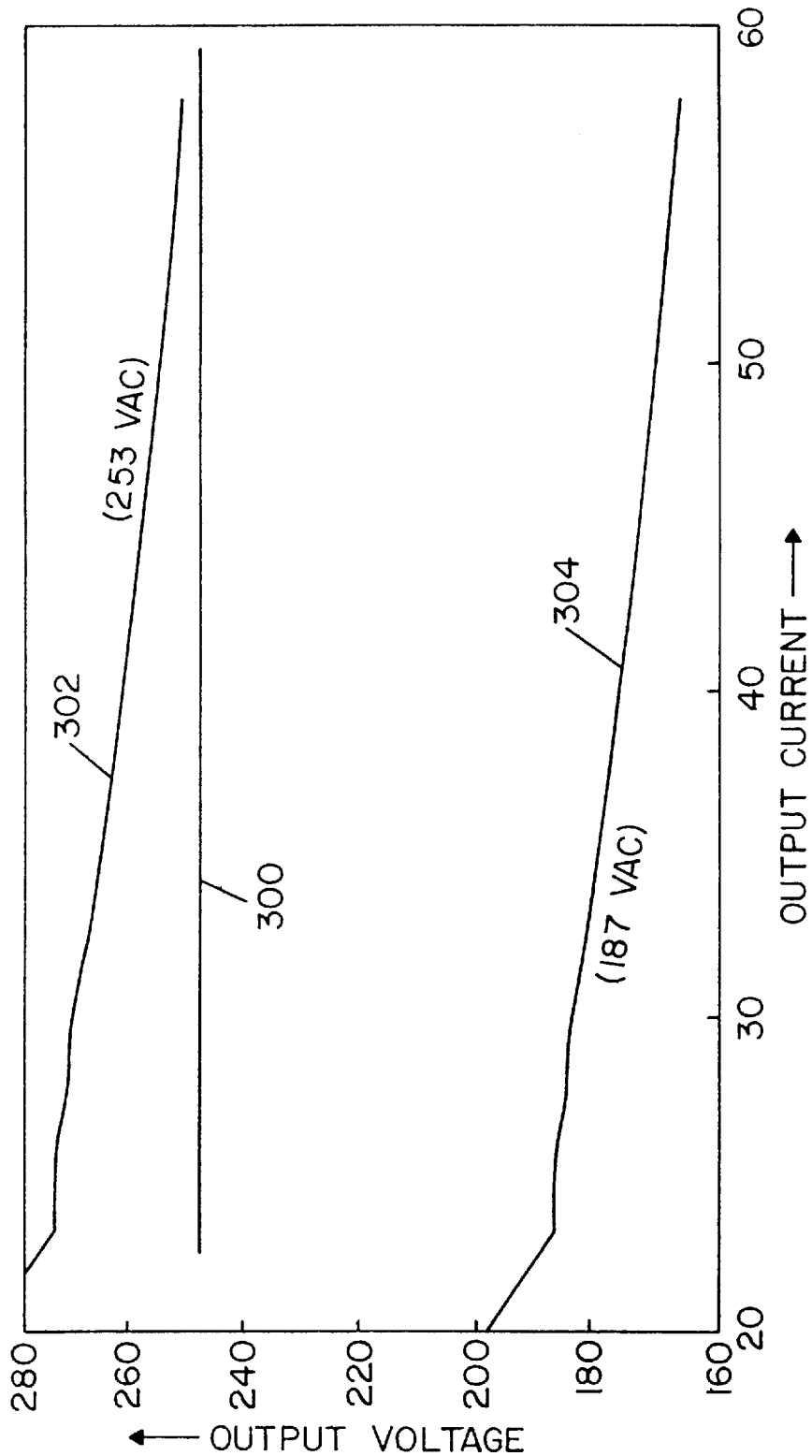
FIG. 3 is a graph illustrating the current voltage output characteristics of a standard D.C. power supply used for driving a plasma arc torch powered at an input voltage of either 253 VAC or 187 VAC.

The graph of FIG. 3 shows a power supply 20 having a rated voltage value of approximately 250 volts, shown by line 300. Such a power supply driven by an input of 253 VAC would produce an output voltage which actually varies along graph 302. The input voltage to the power supply and the transformer turns ratio dictates the voltage curve 302 for power supply 20. As the output current increases the output voltage decreases. If this voltage from power supply 20 were limited to a fixed voltage as is the prior art (Borowy U.S. Pat. No. 5,620,617) represented by fixed voltage 300, the total capacity of this power supply is not obtained. At higher currents, the available voltage for power supply 20 decreases as indicated in line 302. It is inefficient to limit operation of the power supply to a fixed voltage represented by curve 300. Power supply 20 can produce 275 volts at 25 amperes with an input of 253 VAC. At an input of 187 VAC, the output of power supply 20 is represented by curve 304 at the lower portion of FIG. 3. With this curve, 168 volts can be produced at 55 amps. Curves 302 and 304 represent the available output voltage for power supply 20 at different input voltages (253 VAC and 187 VAC). Since the customers electrical service determines the input of the power supply, it is not practical to adjust an arc retract circuit accurately for all operating conditions. Because of the large swing in output voltage and the various input voltages, voltage control of arc retract circuits as used in the past are plagued with variables and inefficiencies. The present invention uses a current droop concept for operating the arc retract circuit.

When voltage levels are used for the arc retract circuit, the power supply operates along line 300. Whenever the voltage from the power supply reaches 250 volts, in line 300, the arc is retracted and the pilot arc mode of operation is established. At lower current levels, power supply 20 is not approaching its maximum utilization. Indeed, at 55 amperes power supply 20 can actually produce 255 volts, a voltage capacity substantially above the fixed voltage of line 300, which is 250 volts. At 25 amperes, power supply 20 can produce as high as 275 volts. Power supply 20 should not be cut off at 250 volts. Such prior art control of the arc retract circuit decreases the utilization factor of the power supply by 10%. In accordance of the present invention, comparator 220 retracts the arc at higher output voltages, especially at lower operation currents.

Figure 4:
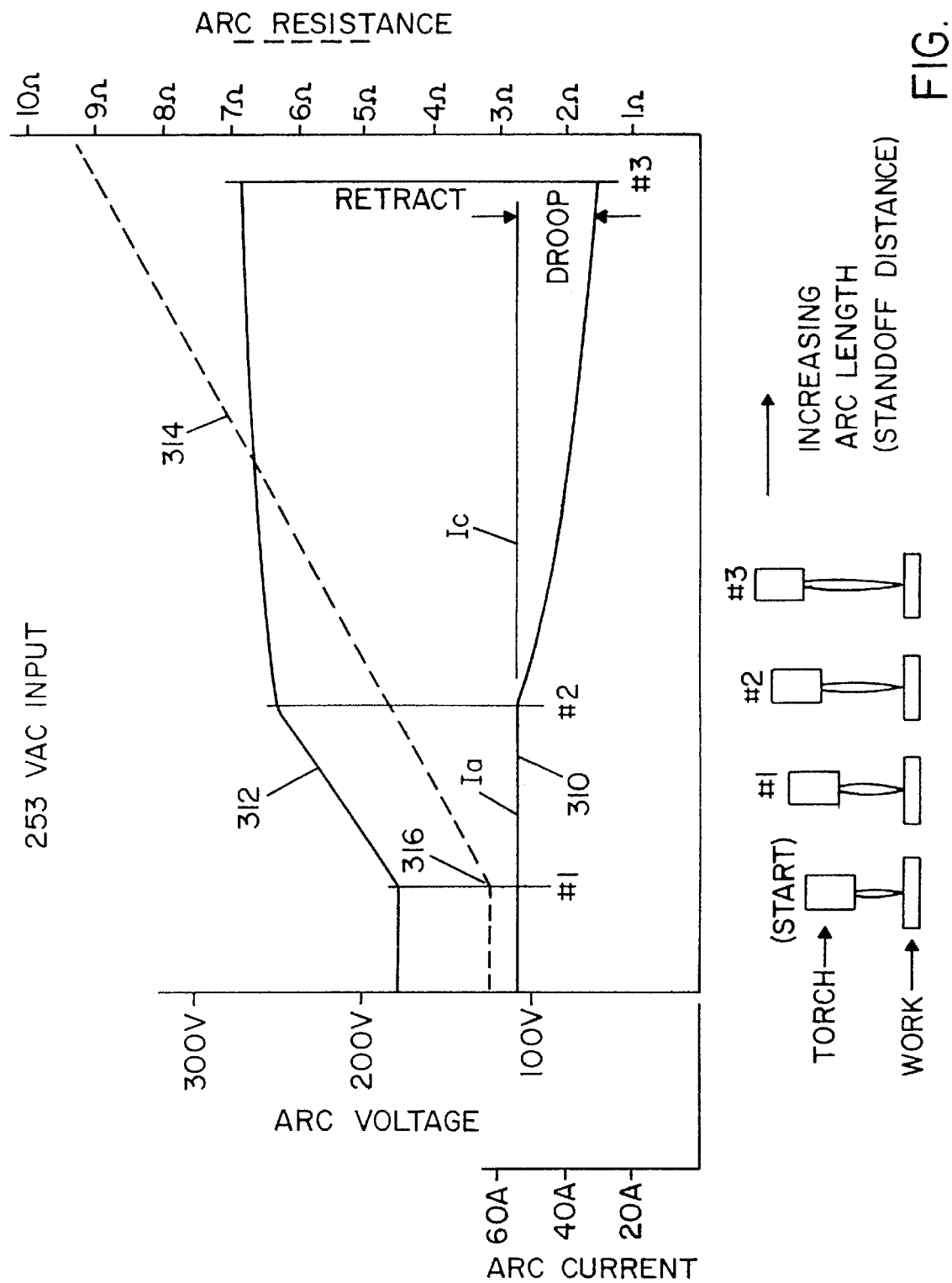
FIG. 4 is a graph illustrating operating characteristics of the preferred embodiment of the present invention which is shown in FIG. 2 when the arc or standoff distance is increased and when operated at an input voltage of 253 VAC.

The present invention causes the arc to be retracted to the nozzle when the power supply 20 can no longer produce the required output current as set by the voltage on terminal 140. The operation of the present invention is explained with respect to the graph in FIG. 4 illustrating where the effect of an increased length or standoff on the parameters of a circuit using the present invention. Curve 310 is the actual current Ia connected to comparator 220. Between positions #1and #2 the actual current is regulated to the cut current Ic. After point #2, the actual current starts to droop as it moves toward point #3. There is a retract signal created at point #3, since the droop Ia is 70% of current Ic. Curve 312 is the voltage developed by power supply 20 attempting to regulate current Ia to set current Ic during the cutting operation. As the length of the arc (standoff) increases from left to right in FIG. 4, current Ia remains substantially constant until point #2. To accomplish this objective, the voltage shown by curve 312 increases to match the increased resistance of the longer arc, illustrated by curve 314. As the arc length continues to increase, the system ultimately reaches point #3 where the signal representative of current Ia on input 104 corresponds with a signal on input 222 which is representative of a percentage of the set current Ic. Comparison of Ia to a percentage of Ic causes a logic 1 in output 230. Switch 124 is closed by control line 150 during the cutting mode of operation. In this matter, a logic 1 appears in line 80 at point #3 to close switch 72 and retract the arc.

At operating point #1 in FIG. 4, power supply 20 is regulated to produce at 55 amperes, the set current Ic. The voltage of power supply 20 is generally constant at about 180 volts. The cutting operation to the standoff at point #1 is well within the operating range of the power supply. At point #1 the power supply voltage (180 volts) is approximately 75 volts below its maximum voltage capability at 55 amperes. As the arc length or standoff is increased, the operating point shifts towards point #2. At this operating point, arc voltage has increased to the absolute maximum voltage that power supply 20 can deliver at 55 amperes. Since the arc retract circuit of the present invention is not voltage dependent, the arc does not retract at point #2, even though the maximum voltage is being produced and the pulse width modulator is 100% on. This is the maximum available voltage for the power supply. However, by using the present invention, the arc length can increase to point #3, since the arc retract of the present invention is controlled by the droop of the arc current and not by any particular voltage levels. Indeed, there is no retract signal caused merely by sensing a preselected fixed output voltage. The cutting arc is maintained well beyond a maximum voltage for the power supply which is reached at standoff point #2. As the arc length or standoff increases after the power supply has reached its maximum voltage for 55 amperes as shown in FIG. 3, at point #2. The current control system including error amplifier 100 loses control at point #2 with the current set level of 55 amperes and the power supply at the maximum of 255 volts. Power supply 20 is fully on and the pulse width modulation is at 100% on. As the arc length increases, beyond point #2 current Ia starts to droop as shown in FIG. 4. Shown by arc resistance curve 314, between points #1 and #3, the resistance of the arc increases with the length or standoff. The increased resistance increases the arc voltage. With the power supply regulated at a constant current of 55 amperes, a linear change in the arc voltage occurs when the resistance changes along curve 314. This is shown after point 316 in curve 312. Beyond point #2 power supply 20 is fully on and the output voltage is at a maximum level for the specific output currents; however, the arc resistance continues to increase with increased standoff. Between points #1 and #2 there is an increase in the output voltage while the current is regulated. After operating point #2 the control system for power supply 20 no longer controls current. The power supply is fully on due to the maximum signal in line 102. The output current starts to droop with increased standoff. When the output current drops or droops below a preselected percentage of the set current set level, the arc is retracted at point #3. The pulse width modulated signal on line 102 is the output from a typical current control error amplifier which is used in constant current power supplies for plasma arc torches. The voltage level on line 102 controls the pulse width modulator of power supply 20. In practice, a signal of 0 volts on line 102 will produce a minimum pulse width modulated duty cycle. A signal having a level of 3.5 volts on line 102 will cause the pulse width modulator to have a duty cycle of 100%. The pulse width modulator operates between 0 volts and 3.5 volts when the control system is actively regulating the current. After point #2 the resistance of the arc causes the cutting current to decrease until a retract signal at point #3. This arc retract signal is created by comparator 220 shown in the lower circuit in FIG. 2. The first input to this current is the actual arc current Ia. The second input 222 is a percentage of the set current Ic during the cutting mode of operation. This percentage will be set to 70%; however, it can be in the range of 40–80% depending upon the application. Preferably it is in the range of 60–80%. A retract signal at a current level of 0.7 Ic and with a cutting current set at 55 amperes will create a retract signal when the actual current Ia is approximately 38.5 amperes. When the actual current is below 38.5 amperes, an arc retract signal in line 230 starts the arc retract sequence.

Figure 5:
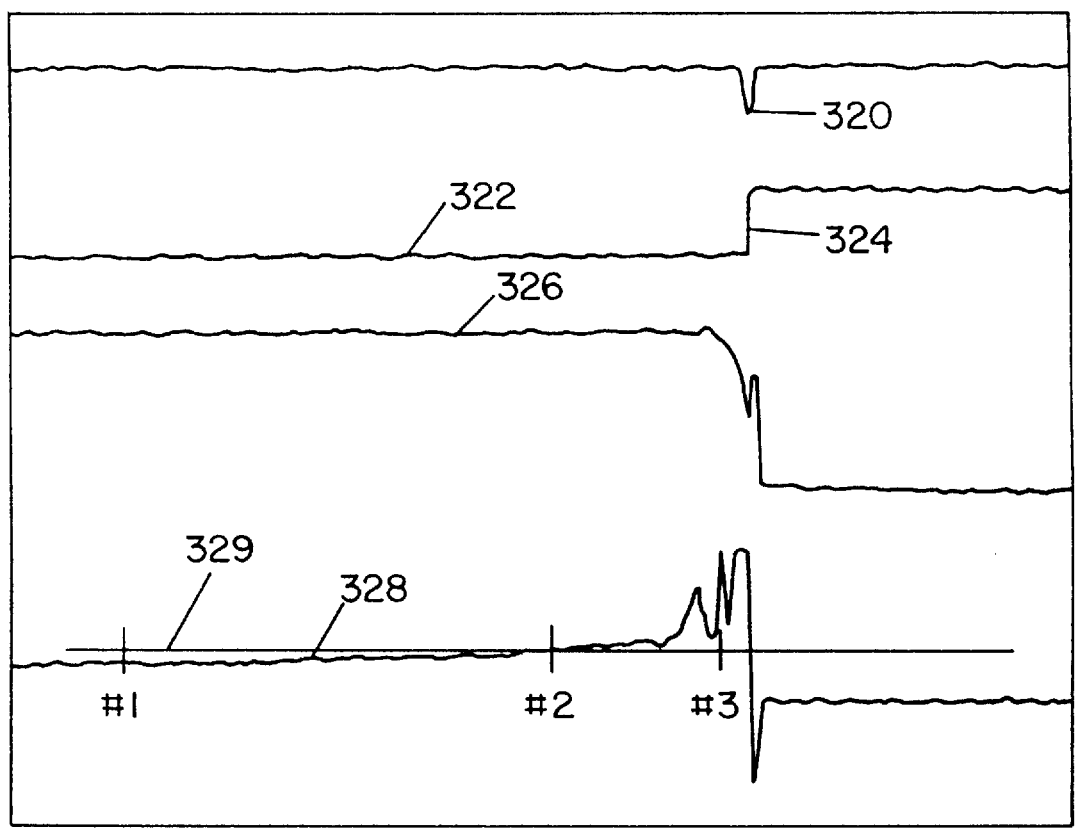
FIGS. 5 and 6 are voltage graphs showing operating characteristics of the preferred embodiment of the present invention, as schematically illustrated in FIG. 2; and, FIG. 7 is a graph plotting the cutting arc current with the retract current for the preferred embodiment of the present invention.

FIG. 5 shows oscilloscope traces recording the events that occur when the cutting arc is moved away from the workpiece very quickly. The upper trace illustrates an arc retract signal 320 appearing on output 230 of comparator 220. The second trace 322 is the condition of power switch 72 which closes at location 324. Trace 326 is arc current Ia. Trace 328 is the voltage on line 102 which controls the pulse width modulator. Operation through point #1 is illustrated to be well within the operating range of the power supply. The input to pulse width modulator as represented by curve 328 is below 3.5 volts represented by line 329, until point #2. As the arc length is increased, the arc resistance increases along curve 314 as shown in FIG. 4. The arc voltage increases and power source 20 reacts by increasing the pulse width modulator voltage, as shown in curve 328. Until point #2 the system retains the regulated output current at the set value of 55 amperes. At operating point #2 the pulse width modulator increases to the maximum usable level by intersecting line 329. This is the region of operation where the power supply is maintaining a cutting arc at the maximum voltage for power supply. If the arc retract circuit were voltage sensitive, the arc retract signal 320 would occur at point #2. The output voltage has reached its maximum value if voltage were the control parameter. If the arc retract circuit were controlled by comparison to a fixed voltage such as shown by curve 300 in FIG. 3, there would be a retract signal at least by the time the standoff reached point #2. In accordance with the present invention, as shown in FIG. 5, the cutting arc is maintained well beyond operating point #2. The present invention maintains the cutting arc until the standoff represented by operating point #3. At this point arc current Ia drops or droops because of the increased arc resistance along curve 314. When the current drops or droops below 70% of the set current Ic, or 38.5 amperes, the arc retract sequence is activated. This causes the arc to reconnect to the nozzle and the pilot arc is maintained as the cutting arc is extinguished.

Figure 6:
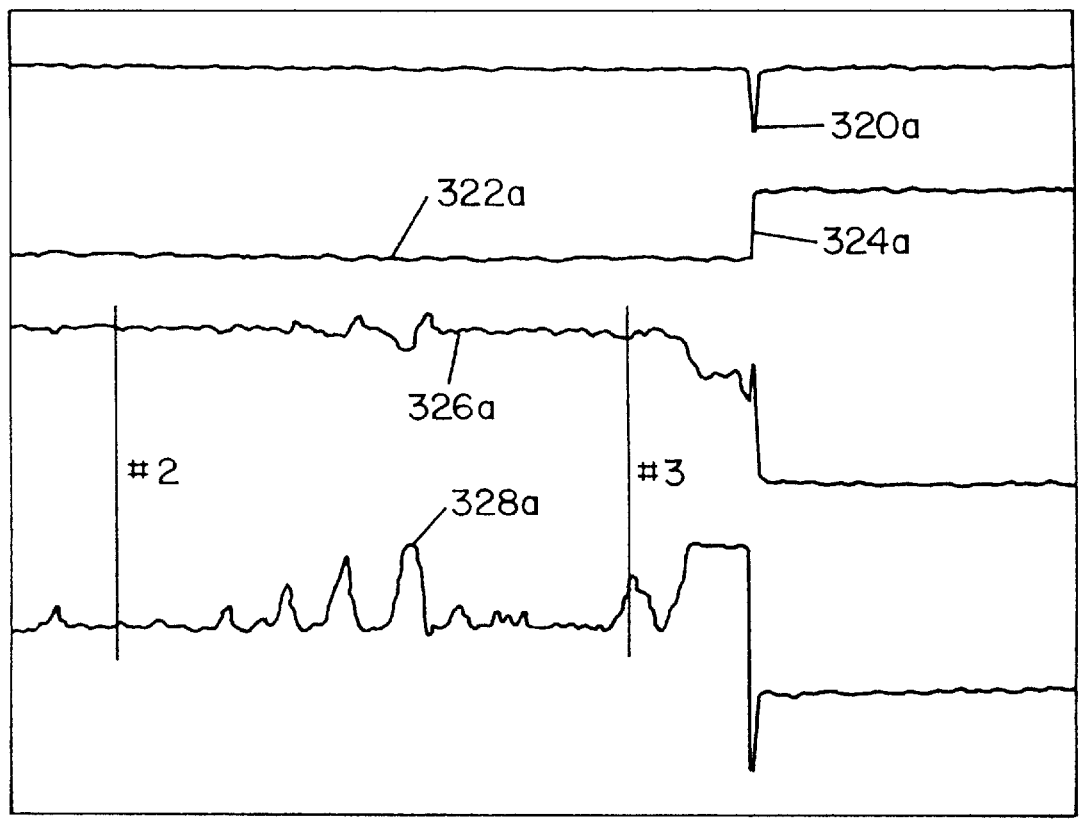

Turning now to FIG. 6, oscilloscope traces illustrate events that occur when the cutting arc is maintained for an extended period of time at the absolute maximum output voltage of power supply 20 between operating points #2 and #3. If the present invention were a voltage control arc retract circuit, it would be impossible to maintain the arc at the maximum output voltage of the power supply. Operating in the region between points #2 and #3 as shown in FIG. 4 would be impossible. When a fixed voltage is reached, the arc would retract. In accordance of the present invention, the cutting arc operates above the maximum voltage level at point #2. After point #2 is reached, the current decreases as shown in FIG. 4; Consequently, the available maximum voltage increases as shown in FIG. 3 because the current shifts to the left. The traces shown in FIG. 6 are the same as the traces shown in FIG. 5, except they are for a longer time at point #2 and include the postscript a. Fluctuations of the arc current in trace 326a indicates that the arc is moving toward operating point #3. When this occurs, the available output voltage increases slightly and power supply 20 recovers to maintain the cutting arc at the decrease current. This action results in additional output voltage because when the output current drops the available voltage increases, as shown in FIG. 3. When comparing two power supplies with the same output voltages, a power supply using the present invention has a notable increase in the maximum arc length over prior art arc retract circuits.

As illustrated in FIGS. 5 and 6, the pilot arc is maintained as the cutting arc is extinguished. Switch 72 is closed when a retract signal occurs in line 230 shown as signal 320 in FIG. 5 and 320a in FIG. 6. In accordance with the present invention, the arc will retract to the nozzle at a transfer current which is less than the set cutting output current of the power supply. This is shown in FIG. 4 at point #3. In prior art circuits, the retract signal is at the set current Ic. The present invention retracts the arc at a value less than the set current. Retraction of the arc at lower currents than the rated current of the power supply and indeed the cutting current set point terminal 140, eliminates high current overshoot into the nozzle as experienced by prior art arc retract circuits. This switching to the pilot arc mode at a reduced operating current reduces the size needed for switch 72. Over current damage to nozzle 34 is also decreased. In the past, the arc is retracted at the operating current appearing on terminal 140. Consequently, in a 55 ampere plasma arc torch, the arc is retracted at 55 amperes. After the arc has been retracted at 55 amperes, mode selector switch 120 shifts to reduce the current level. However, the actual transfer is at the higher level. In accordance with the present invention, arc retract is at 38.5 amperes to reduce the size of the switch 72 and reduce damage to the nozzle.

The zener diode 240 as shown in FIG. 2 is used to limit the maximum value of the retract current to control overshoot of current in the nozzle. The maximum retract current is limited to 40 amperes. As the set cut current increases, the invention causes the signal on input 222 of comparator 220 to be correspondingly increased. By using the zener diode when the set current Ic is above a level exceeding value of diode 240, input 222 is clamped to that value. This is shown in FIG. 7 where the retract signal is fixed above about 55 amperes to produce a retract signal at about 38 amperes.

Having thus defined the invention, the following is claimed:

1. In a plasma arc torch having an electrode in a nozzle, a power supply for providing a D.C. current, a power circuit for connecting said power supply across said electrode and a workpiece to be cut, a power switch for connecting said nozzle to said power supply when in a closed condition defining a pilot arc mode of said torch and for disconnecting said nozzle from said workpiece when in an open condition defining a cutting arc mode, amplifier means for regulating said power supply to a first set current when in said pilot arc mode and a second set current when in said cutting arc mode, and an arc retract circuit for shifting said power switch from said open condition to said closed condition, the improvement comprising: said arc retract circuit including current sensing means for creating a first signal representing the actual current applied by said power supply to said power circuit, means for creating a second signal representative of a current level below said second set current, and switch operations means for closing said power switch when said first signal is substantially equal to said second signal.

2. The improvement, as defined in claim 1, wherein said current level is a percentage of said second set current.

3. The improvement, as defined in claim 2, wherein said percentage is in the general range of 60–80%.

4. The improvement, as defined in claim 3, wherein said switch operating means includes a comparator having a power switch closing output signal when said first signal is substantially equal to said second signal.

5. The improvement, as defined in claim 2, wherein said switch operating means includes a comparator having a switch closing output signal when said first signal is substantially equal to said second signal.

6. The improvement, as defined in claim 1, wherein said switch operating means includes a comparator having a switch closing output signal when said first signal is substantially equal to said second signal.

7. The improvement, as defined in claim 2, wherein said second signal creating means is a voltage divider connected to a terminal having a voltage representative of said second set current and an output at an intermediate location on said voltage divider to create said second signal.

8. The improvement, as defined in claim 1, wherein said second signal creating means is a voltage divider connected to a terminal having a voltage representative of said second set current and an output at an intermediate location on said voltage divider to create said second signal.

9. The improvement, as defined in claim 8, wherein said switch operating means includes limiting means for limiting the maximum value of said second signal.

10. The improvement, as defined in claim 9, wherein said limiting means is a zener diode.

11. The improvement, as defined in claim 1, wherein said switch operating means includes limiting means for limiting the maximum value of said second signal.

12. The improvement, as defined in claim 11, wherein said limiting means is a zener diode.

13. A method retracting the cutting arc to establish a pilot arc mode of operation in a plasma arc system with a torch having an electrode in a nozzle, a power supply for providing a D.C. current, a power circuit for connecting said power supply across said electrode and a workpiece to be cut, a power switch for connecting said nozzle to said power supply when in a closed condition defining a pilot arc mode of said torch and for disconnecting said nozzle from said workpiece when in an open condition defining a cutting arc mode, and amplifier means for regulating said power supply to a first set current when in said pilot arc mode and a second set current when in said cutting arc mode, said method comprising the steps of:

(a) creating a first signal representing the actual current applied by said power supply to said power circuit, (b) creating a second signal representative of a current level below said second set current; and, (c) closing said power switch when said first signal is substantially equal to said second signal.

14. A method, as defined in claim 13, including the additional step of:

(d) creating said current level as a percentage of said second set current.

15. The method, as defined in claim 14, wherein said percentage is in the general range of 60–80%.

16. The method, as defined in claim 13, including the additional steps of:

(e) limiting the maximum value of said second signal.

\* \* \* \* \*